United States Patent
Komiyama

(10) Patent No.: US 8,265,715 B2
(45) Date of Patent: *Sep. 11, 2012

(54) DUSTPROOF STRUCTURE FOR SLIDE TYPE ELECTRONIC DEVICE AND SLIDE TYPE ELECTRONIC DEVICE

(75) Inventor: Takehiko Komiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,632

(22) Filed: Sep. 14, 2011

(65) Prior Publication Data

US 2012/0002390 A1 Jan. 5, 2012

Related U.S. Application Data

(63) Continuation of application No. 12/281,370, filed on Sep. 2, 2008, now Pat. No. 8,055,315.

(30) Foreign Application Priority Data

Mar. 2, 2006 (JP) .................................. 2006-055804

(51) Int. Cl.
*H04M 1/00* (2006.01)

(52) U.S. Cl. ..................... 455/575.1; 277/355; 277/407; 277/409

(58) Field of Classification Search ............... 455/575.4; 277/355, 407, 409

See application file for complete search history.

(56) References Cited

U.S. PATENT DOCUMENTS 8,055,315 B2 * 11/2011 Komiyama ................ 455/575.1

FOREIGN PATENT DOCUMENTS

GB 2142693 * 1/1985
JP 2004-153597 A * 5/2004

* cited by examiner

*Primary Examiner* — Jean Gelin
*Assistant Examiner* — Quan Hua

(57) ABSTRACT

There are a first packing 31 and a second packing 32 for covering and sealing a first opening portion 11*a* and a second opening portion 12*a* other than a groove portion 31*a* and a groove portion 32*a* for leading an FPC 20. The first packing 31 and the second packing 32 wipe surfaces of the FPC 20 corning in and going out of the groove portion 31*a* and the groove portion 32*a* by sliding operation of a second frame 12.

9 Claims, 6 Drawing Sheets

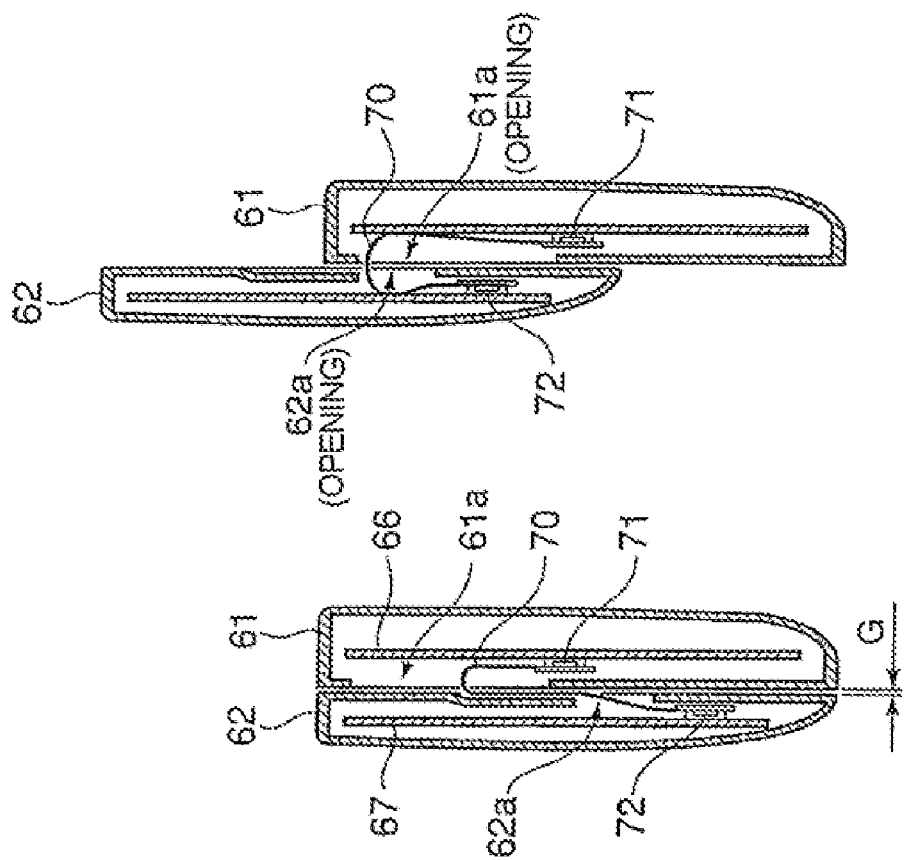
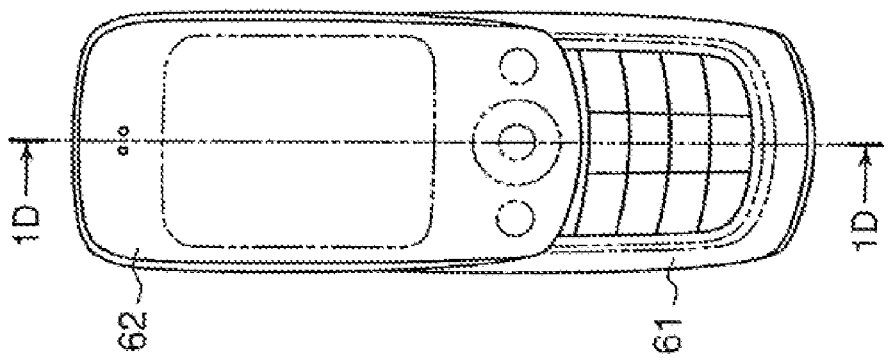
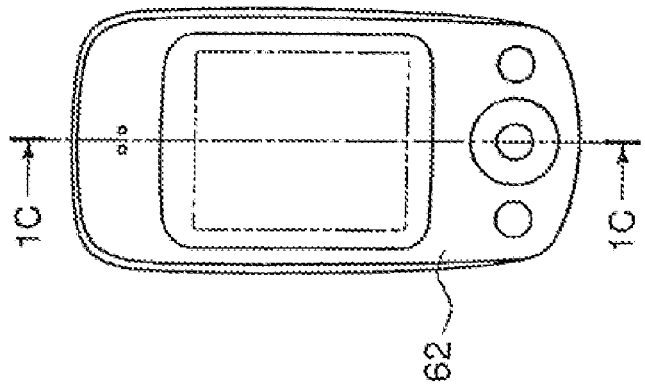
FIG. 1A   FIG. 1B   FIG. 1C   FIG. 1D

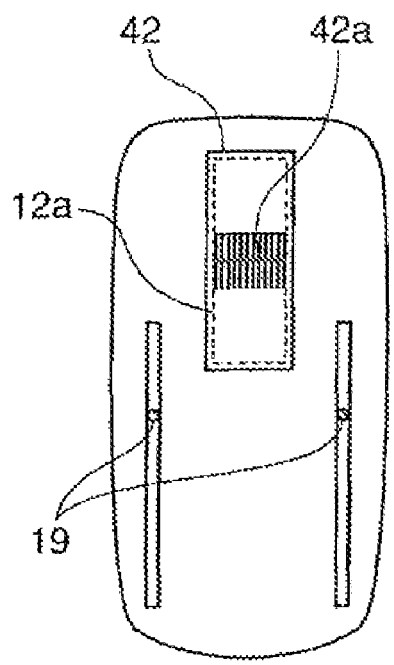 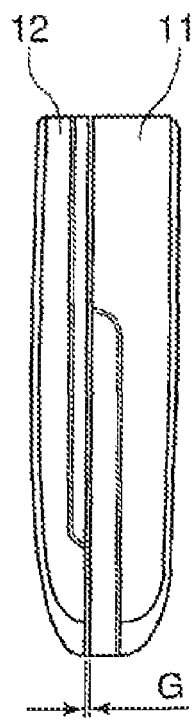 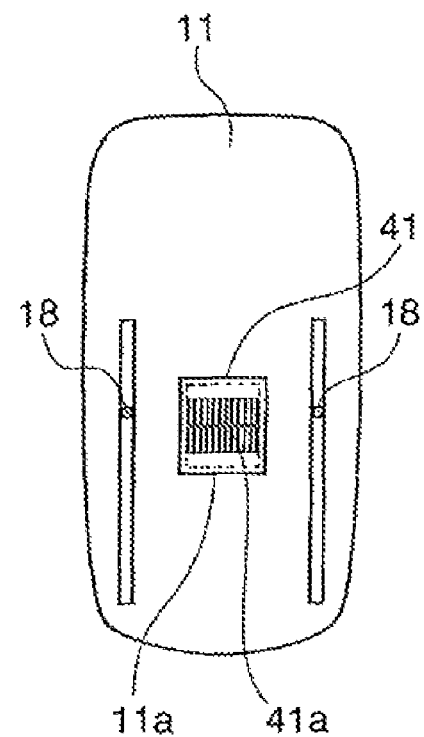
FIG. 6A   FIG. 6B   FIG. 6C
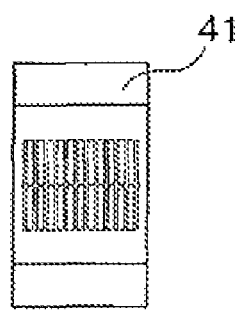 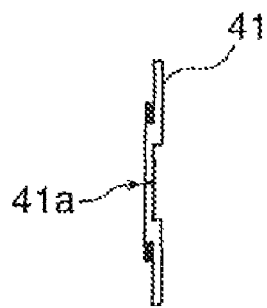 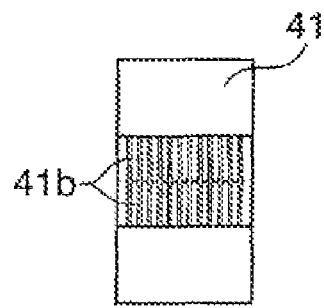
FIG. 7A   FIG. 7B   FIG. 7C

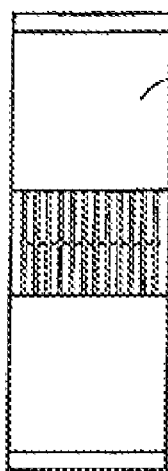 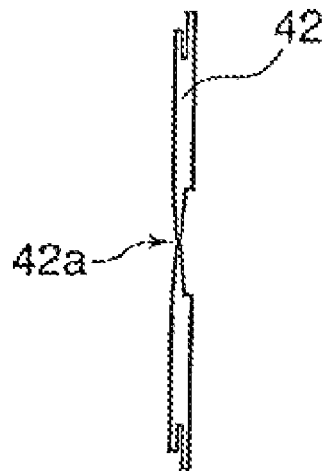 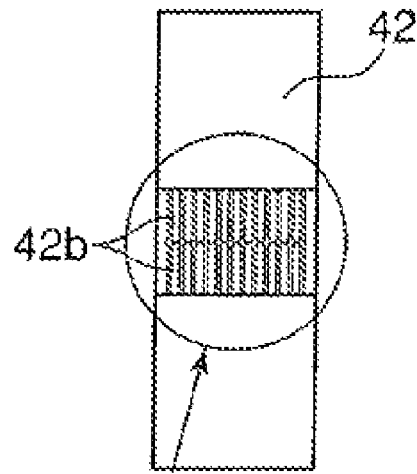
FIG. 8A  FIG. 8B  FIG. 8C
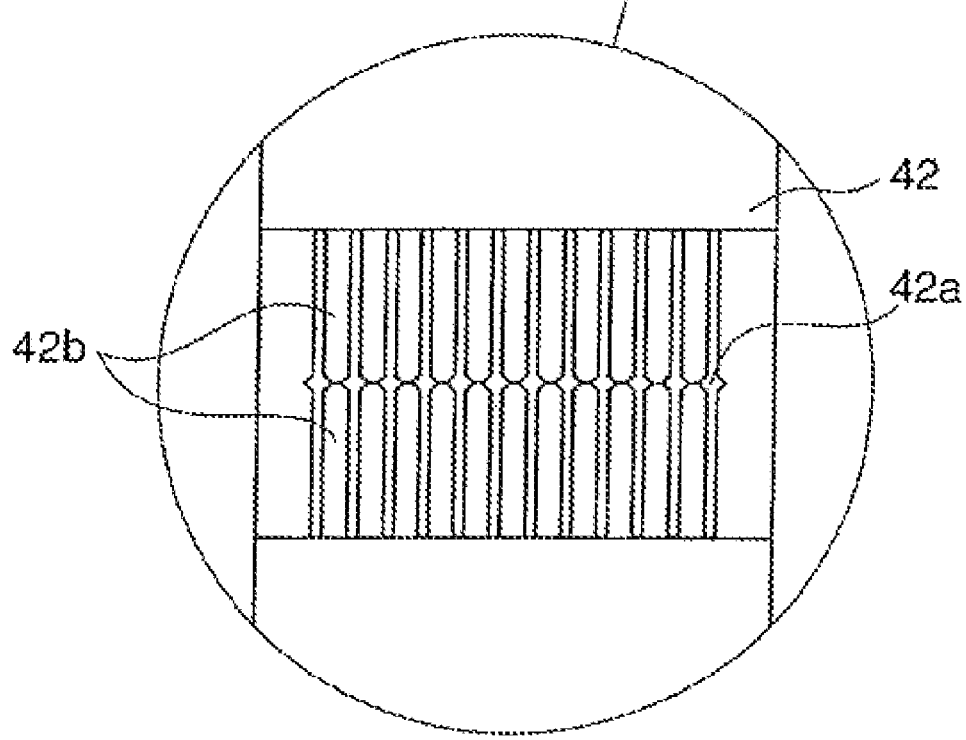
FIG. 8D

DUSTPROOF STRUCTURE FOR SLIDE TYPE ELECTRONIC DEVICE AND SLIDE TYPE ELECTRONIC DEVICE

REFERENCE TO RELATED APPLICATION

This is a continuation application of U.S. patent application Ser. No. 12/281,370 filed Sep. 2, 2008 now U.S. Pat. No. 8,055,315 and claims the benefit of its priority.

TECHNICAL FIELD

The present invention relates to a slide type electronic device having a first frame, a second frame mounted on the first frame so as to be slidable relative to the first frame, and wiring to electrically connect electronic components integrated in the first frame and the second frame to each other, and more particularly to a dustproof structure in the frame.

BACKGROUND ART

For example, these slide type electronic devices include a slide type cellular phone, a slide type PDA, and the like. Generally, in a slide type electronic device, electronic components integrated in a first frame and a second frame are electrically connected by wiring such as a flexible board (Flexible Printed Circuit board: FPC) extending through a first opening portion and a second opening portion formed in opposing surfaces of the frames.

The wiring such as an FPC is designed so as to have such a length that it is not broken by application of stress even when the second frame is slid to the maximum relative to the first frame. Specifically, a margin is provided for the wiring. The margin portions come in and go out of the first opening portion and the second opening portion when the second frame is slid relative to the first frame. Therefore, in order not to inhibit the coming and going of the wiring, the first opening portion and the second opening portion have a considerably large clearance as compared to the dimension of the wiring.

Japanese laid-open patent publication No. 2005-135417 discloses a slide type cellular phone as an example of slide type electronic devices. This slide type portable terminal has a first frame and a second frame mounted on the first frame so as to be slidable relative to the first-frame. Electronic components integrated in the first frame and the second frame are electrically connected by an FPC extending through a first opening portion and a second opening portion formed in opposing surfaces of the first frame and the second frame, which is not illustrated. The FPC comes in and goes out of the first opening portion and the second opening portion when the second frame is slid relative to the first frame. In order not to inhibit the coming and going of the FPC, the first opening portion and the second opening portion have a considerably large clearance as compared to the dimension of the FPC.

FIGS. 1A to 1D show a slide type cellular phone similar to one disclosed in Japanese laid-open patent publication No. 2005-135417. This slide type cellular phone has a first frame 61 and a second frame 62 mounted on the first frame 61 so as to be slidable relative to the first frame. In order to slide the second frame 62 without friction, a gap G is formed between the first frame 61 and the second frame 62.

A first circuit board 66, as a first electronic component integrated in the first frame 61, and a second circuit board 67, as a second electronic component integrated in the second frame 62, are electrically connected to each other by an FPC 70 extending through a first opening portion 61*a* and a second opening portion 62*a* formed in opposing surfaces of the first frame 61 and the second frame 62. The reference numerals 71 and 72 represent connectors.

The FPC 70 comes in and goes out of the first opening portion 61*a* and the second opening portion 62*a* when the second frame 62 is slid relative to the first frame 61. In order not to inhibit the coming and going of the FPC 70, the first opening portion 61*a* and the second opening portion 62*a* have a considerably large clearance as compared to the dimension of the FPC 70.

In the slide type electronic devices including one shown in FIGS. 1A to 1D, foreign substances such as dust or moisture may enter a gap formed between a first frame and a second frame.

There have heretofore been taken no countermeasures against foreign substances such as dust or moisture entering a gap. Dust or moisture entering the gap may enter the first frame through the first opening portion, thereby causing damage to the first electronic device. Furthermore, dust or moisture entering the gap may enter the second frame through the second opening portion, thereby causing damage to the second electronic device.

According to recent enhancement in functions of slide type electronic devices, liquid crystal displays have been upsized and the number of operation buttons has been increased. As a result, the number of lines in wiring which connects a first electronic component and a second electronic component to each other has been increased, and the dimension such as the width has been increased. First opening portions and second opening portions have also been upsized so as to correspond to wiring having increased dimensions. Therefore, the probability that foreign substances enter a frame has been increased as well.

DISCLOSURE OF INVENTION

Accordingly, an object of the present invention is to provide a dustproof structure for a slide type electronic device which can prevent foreign substances such as dust or moisture from entering a frame.

Another object of the present invention is to provide a slide type electronic device having a dustproof structure as described above.

According to the present invention, there is provided a dustproof structure for a slide type electronic device having a first frame including a first electronic component therein, a second frame including a second electronic component therein, the second frame being mounted on the first frame so as to be slidable relative to the first frame, and wiring extending through a first opening portion and a second opening portion formed in opposing surfaces of the first frame and the second frame and electrically connecting the first electronic component and the second electronic component to each other, characterized by comprising: at least one packing (gasket, shield) for covering and sealing at least one of the first opening portion and the second opening portion other than a groove portion for leading the wiring, the packing wiping a surface of the wiring coming in and going out of the groove portion by sliding operation of the second frame.

The at least one packing may be two packings for covering and sealing the first opening portion and the second opening portion, respectively. Furthermore, the packing may be formed of a material having a low coefficient of friction. Moreover, the packing may have flexibility. Furthermore, the packing may have a curtain portion in which a plurality of segments terminating at the groove portion are arranged.

The wiring may be an FPC.

The second frame may be mounted on the first frame so as to be pivotably slidable relative to the first frame.

According to the present invention, there is provided a slide type electronic device having the aforementioned dustproof structure for a slide type electronic device.

BRIEF DESCRIPTION OF DRAWINGS

FIGS. 1A to 1D are views showing a slide type electronic device having a dustproof structure as a related art.

FIGS. 6A to 6C are views showing a slide type electronic device having a dustproof structure according to Embodiment 2 of the present invention.

FIGS. 7A to 7C are views showing a first packing in the dustproof structure according to Embodiment 2 of the present invention.

FIGS. 8A to 8D are views showing a second packing in the dustproof structure according to Embodiment 2 of the present invention.

BEST MODE FOR CARRYING OUT THE INVENTION

A dustproof structure according to the present invention is applied to a slide type electronic device such as a slide type cellular phone having a first frame including a first electronic component therein, a second frame including a second electronic component therein, the second frame being mounted on the first frame so as to be slidable relative to the first frame, and wiring extending through a first opening portion and a second opening portion formed in opposing surfaces of the first frame and the second frame and electrically connecting the first electronic component and the second electronic component to each other.

The dustproof structure has at least one packing (gasket, shield) for covering and sealing at least one of the first opening portion and the second opening portion other than a groove portion for leading the wiring. A surface of the wiring coming in and going out of the groove portion by sliding operation of the second frame is wiped by the packing.

A dustproof structure for a slide type electronic device and a slide type electronic device according to embodiments of the present invention will be described below with reference to the drawings.

[Embodiment 1]

FIGS. 2A to 2D and 3A to 3C show a slide type cellular phone as a slide type electronic device to which a dustproof structure according to Embodiment 1 of the present invention is applied. This cellular phone has a first frame 11 and a second frame 12 mounted on the first frame 11 so as to be slidable relative to the first frame 11.

Figure 2A:
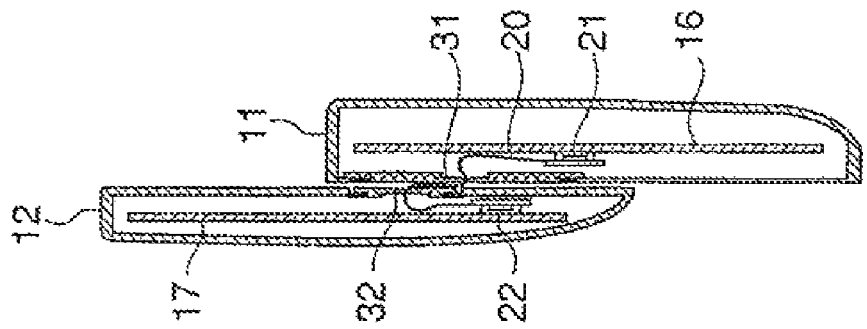
FIGS. 2A to 2D are views showing a slide type electronic device having a dustproof structure according to Embodiment 1 of the present invention.
Figure 2B:
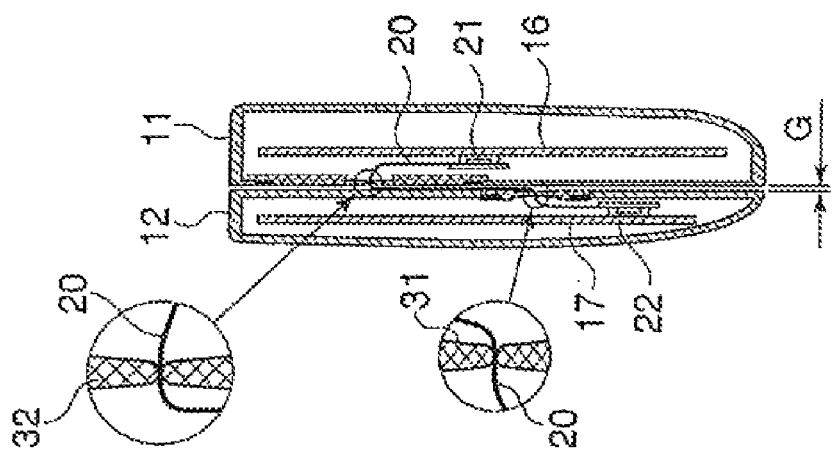
Figure 2C:
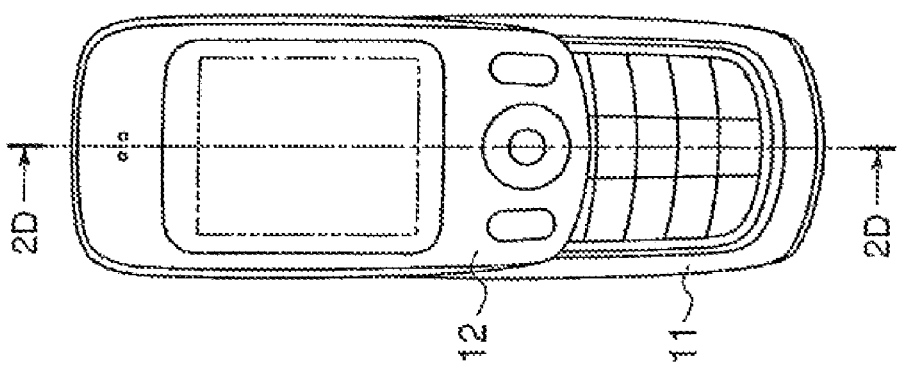
Figure 2D:
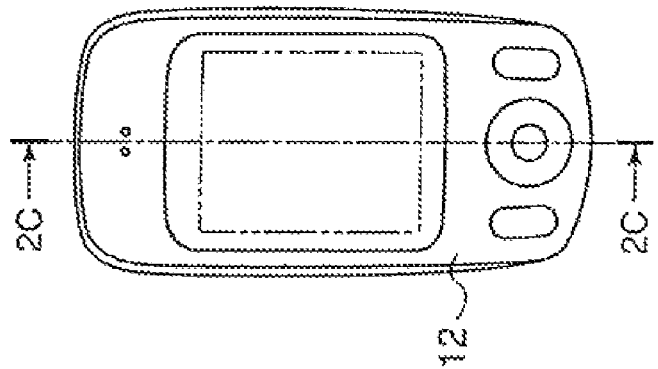
Figures 3A, 3B, 3C:
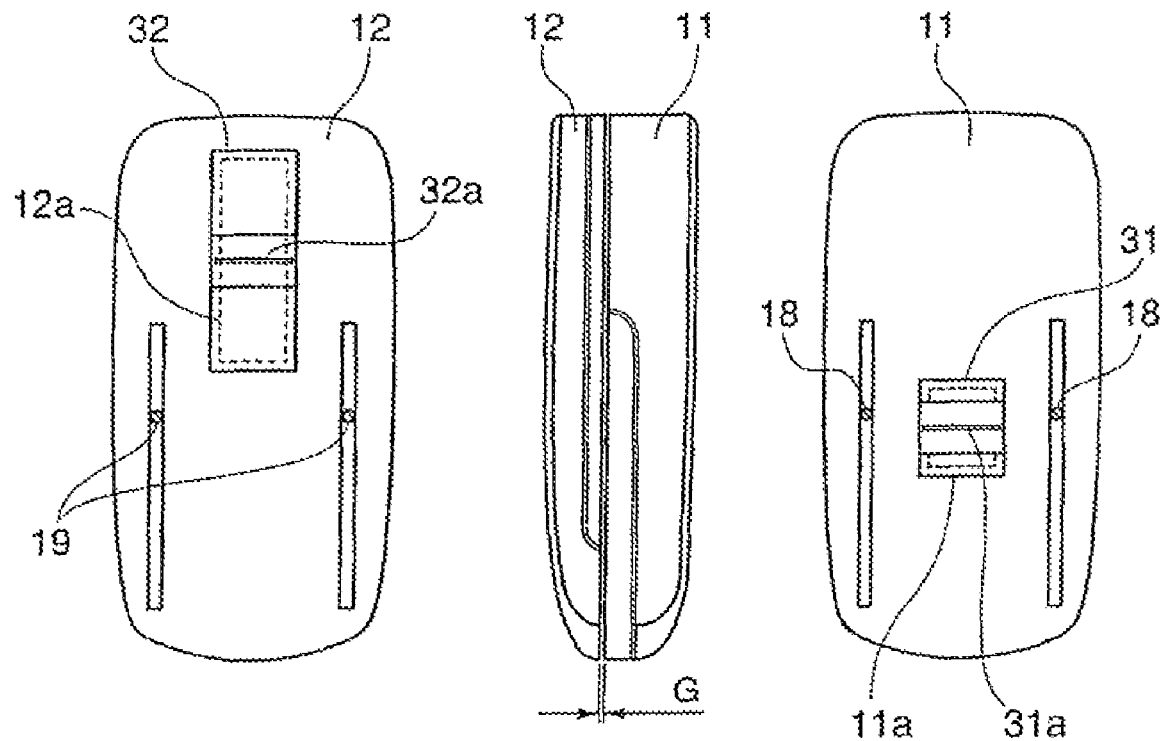
FIGS. 3A to 3C are views showing the slide type electronic device having the dustproof structure according to Embodiment 1 of the present invention.
Figures 4A, 4B, 4C:
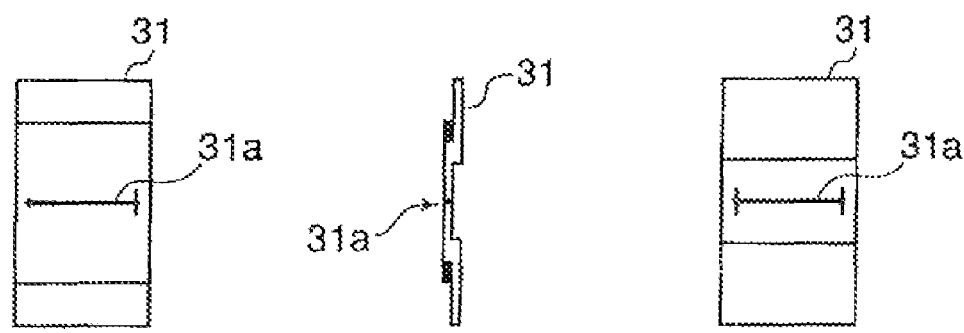
FIGS. 4A to 4C are views showing a first packing in the dustproof structure according to Embodiment 1 of the present invention.
Figure 5A:
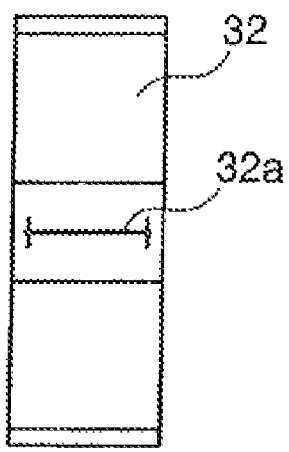
FIGS. 5A to 5D are views showing a second packing in the dustproof structure according to Embodiment 1 of the present invention.
Figure 5B:
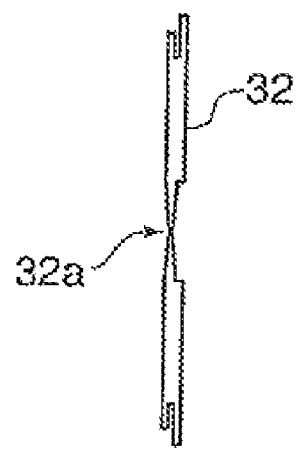
Figure 5C:
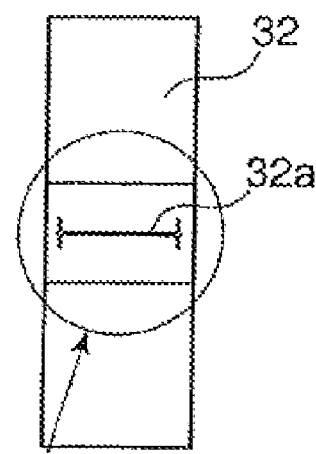
Figure 5D:
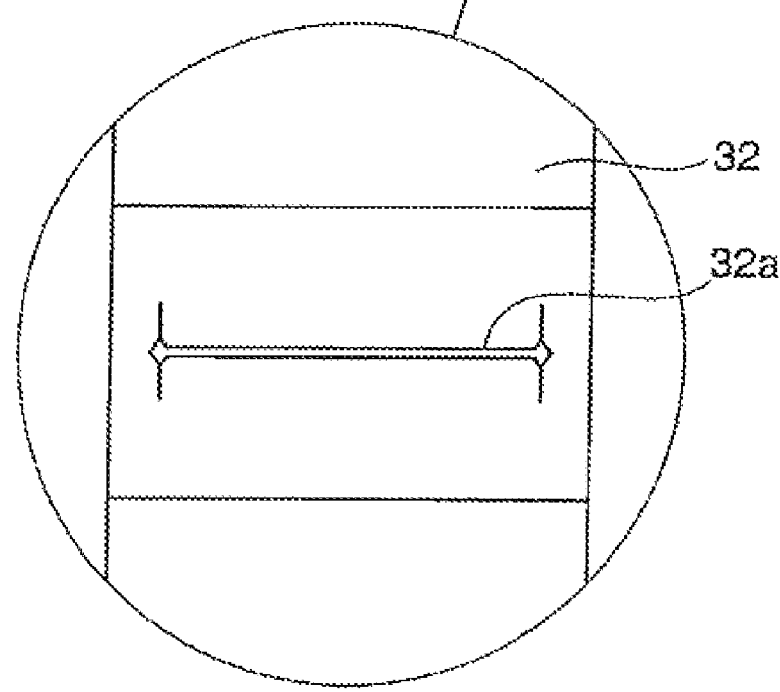

The first frame 11 includes therein a first circuit board 16 as a first electronic component, a rechargeable battery, which is not shown, and the like. A keyboard, which is omitted from the illustration in FIG. 3C, is provided on a front face of the first frame 11.

The second frame 12 includes therein a second circuit board 17 as a second electronic component, an antenna, which is not shown, and the like. A liquid crystal display, a cursor button, a speaker, a microphone, and the like are provided on a front face of the second frame 12.

Sliders 18 and 19 for coupling the first frame 11 and the second frame 12 such that the first frame 11 and the second frame 12 are slidable to each other are provided on the opposing surfaces of the first frame 11 and the second frame 12, i.e., the front face of the first frame 11 and the front face of the second frame 12, respectively. Furthermore, in order to slide the second frame 12 without friction, a gap G is formed between the first frame 11 and the second frame 12.

The first circuit board 16 incorporated in the first frame 11 and the second circuit board 17 incorporated in the second frame 12 are electrically connected to each other by an FPC 20 extending through a first opening portion 11a and a second opening portion 12a formed in the opposing surfaces of the first frame 11 and the second frame 12. The reference numerals 21 and 22 represent connectors.

The FPC 20 comes in and goes out of the first opening portion 11a and the second opening portion 12a when the second frame 12 is slid relative to the first frame 11. In order not to inhibit the coming and going of the FPC 20, the first opening portion 11a and the second opening portion 12a have a clearance corresponding to the dimension of the FPC 20.

This cellular phone, in particular, has a first packing 31 and a second packing 32 mounted on the first opening portion 11a and the second opening portion 12a, respectively, to cover and seal the opening portions other than a groove portion 31a and a groove portion 32a for leading the FPC 20. The first packing 31 and the second packing 32 are fitted in the first opening portion 11a and the second opening portion 12a, respectively. The first packing 31 and the second packing 32 may be mounted on the first opening portion 11a and the second opening portion 12a, respectively, by bonding, fixing with screws, or pressing with plates.

FIGS. 4A to 4C and 5A to 5D show the first packing 31 and the second packing 32.

The surfaces of the FPC 20 coming in and going out of the groove portion 31a and the groove portion 32a by sliding operation of the second frame 12 are wiped by the first packing 31 and the second packing 32. Even if dust or moisture entering the gap G is attached to the surfaces of the FPC 20 exposing to the gap G, it is wiped out when the surfaces pass through the groove portion 31a and the groove portion 32a by the sliding operation of the second frame 12. As a result, dust or moisture enters neither the first frame 11 nor the second frame 12.

The first packing 31 and the second packing 32 are formed of silicon rubber. Nevertheless, a plastic plate, a sponge, or the like may be used for the first packing 31 and the second packing 32. In order not to inhibit the coming and going of the FPC 20, it is desirable that the material of the packings have flexibility and a low coefficient of friction. Furthermore, it is desirable that the material of the packings have excellent durability.

[Embodiment 2]

Embodiment 2 of the present invention has features in the shape of the packings. Therefore, the same or similar parts as in Embodiment 1 are omitted from the illustration and detailed explanation.

FIGS. 6A to 6C show a slide type cellular phone as a slide type electronic device to which a dustproof structure according to Embodiment 2 of the present invention is applied. This cellular phone has a first frame 11 and a second frame 12 mounted on the first frame 11 so as to be slidable relative to the first frame 11.

This cellular phone has a first packing 41 and a second packing 42 mounted on a first opening portion 11a and a second opening portion 12a to cover and seal the opening portions other than a groove portion 41a and a groove portion 42a for leading an FPC. The first packing 41 and the second packing 42 are fitted in the first opening portion 11a and the second opening portion 12a, respectively. The first packing 41 and the second packing 42 may be mounted on the first opening portion 11a and the second opening portion 12a, respectively, by bonding, fixing with screws, or pressing with plates.

FIGS. 7A to 7C and 8A to 8D show the first packing 41 and the second packing 42. Each of the first packing 41 and the second packing 42 has a curtain portion in which a plurality of segments 41b or 42b terminating at the groove portion 41a or the groove portion 42a are arranged.

The surfaces of the FPC coming in and going out of the groove portion 41a and the groove portion 42a by sliding operation of the second frame 12 are wiped by the first packing 41 and the second packing 42. Even if dust or moisture entering the gap G is attached to the surfaces of the FPC exposing to the gap G, it is wiped out when the surfaces pass through the groove portion 41a and the groove portion 42a by the sliding operation of the second frame 12. As a result, dust or moisture enters neither the first frame 11 nor the second frame 12.

The first packing 41 and the second packing 42 are formed of a plastic plate having a thickness of 0.2 mm. Nevertheless, silicon rubber or the like may be used for the first packing 41 and the second packing 42. In order not to inhibit the coming and going of the FPC 20, it is desirable that the material of the packings have flexibility and a low coefficient of friction. Furthermore, in the case where the packings are formed of a plastic plate, the thickness of the packings is set so as to achieve desired flexibility. Moreover, it is also desirable that the material of the packings have excellent durability. Furthermore, edges of the segments 41b of the first packing 41 and edges of the segments 42b of the second packing 42, which define the groove portion 41a and the groove portion 42a, respectively, are rounded. The shape of the segments 41b and the segments 42b may be flat or sharp as long as no hindrance is caused to the friction on the surfaces of the FPC.

Industrial Applicability

The present invention is not limited to the aforementioned embodiments. As a matter of course, various modifications may be made within the technical scope described in the claims. For example, the present invention is applicable not only to belt-shaped wiring, such as FPC, but also to linear wiring. The present invention is also applicable not only to a linear-slide type electronic device, but also to a pivotal-slide type electronic device.

The invention claimed is:

1. A dustproof structure for a slide type portable station which is an electronic device performing to at least one of information processing and information communicating, the slide type portable station having:
   a first frame including a first electronic component therein,
   a second frame including a second electronic component therein,
   the second frame being mounted on the first frame so as to be slidable relative to the first frame, and
   wiring extending through a first opening portion and a second opening portion formed in opposing surfaces of the first frame and the second frame and electrically connecting the first electronic component and the second electronic component to each other, the dustproof structure comprising:
   a packing covering and sealing the opening portion other than a groove portion,
   the groove portion being formed on the packing and leading the wiring via the opening portion;
   wherein the packing is formed of silicon rubber or plastic plate;
   the groove portion of the packing continuously contacts with a surface of the wiring; and
   the packing wipes the surface of the wiring coming in and going out of the groove portion by sliding operation of the second frame.

2. The dustproof structure for a slide type portable station according to claim 1, wherein the slide type portable station is a slide type cellular phone or a slide type PDA.

3. The dustproof structure for a slide type portable station according to claim 1, wherein the packing is formed of a material having a low coefficient of friction.

4. The dustproof structure for a slide type portable station according to claim 1, wherein the packing has flexibility.

5. The dustproof structure for a slide type portable station according to claim 1, wherein the packing has a curtain portion in which a plurality of segments terminating at the groove portion are arranged.

6. The dustproof structure for a slide type portable station according to claim 1, wherein the wiring comprises a flexible board.

7. The dustproof structure for a slide type portable station according to claim 1, wherein the second frame is mounted on the first frame so as to be pivotably slidable relative to the first frame.

8. A slide type portable station which is an electronic device performing to at least one of information processing and information communicating, the slide type portable station comprising:
   a first frame including a first electronic component therein,
   a second frame including a second electronic component therein,
   the second frame being mounted on the first frame so as to be slidable relative to the first frame,
   wiring extending through an opening portion formed in at least one of opposing surfaces of the first frame and the second frame and electrically connecting the first electronic component and the second electronic component to each other, and
   a dustproof structure comprising:
   a packing covering and sealing the opening portion other than a groove portion,
   the groove portion being formed on the packing and leading the wiring via the opening portion, wherein:
   the packing is formed of silicon rubber or plastic plate;
   the groove portion of the packing continuously contacts with a surface of the wiring; and
   the packing wipes the surface of the wiring coming in and going out of the groove portion by sliding operation of the second frame.

9. The dustproof structure for a slide type portable station according to claim 1, wherein the opening portion includes a first opening portion and a second opening portion formed in opposing surfaces of the first frame and the second frame;

the wiring extends through the first opening portion and the second opening portion and electrically connects the first electronic component and the second electronic component to each other;

the packing includes first and second packings covering and sealing the first and the second opening portions other than groove portions, the groove portions being formed on the first and the second packings and leading the wiring via the first and the second opening portions, respectively;

the groove portions of the first and the second packings continuously contact with a surface of the wiring, respectively;

the first and the second packings wipe the surface of the wiring coming in and going out of the groove portions by sliding operation of the second frame, respectively.

* * * * *